April 3, 1962        E. E. MOSS        3,027,594

ANIMAL RESTRAINING SYSTEMS

Original Filed Feb. 20, 1959        2 Sheets-Sheet 1

INVENTOR.
Edgar E. Moss
BY
*S. Alpheus Luker*
ATTORNEY

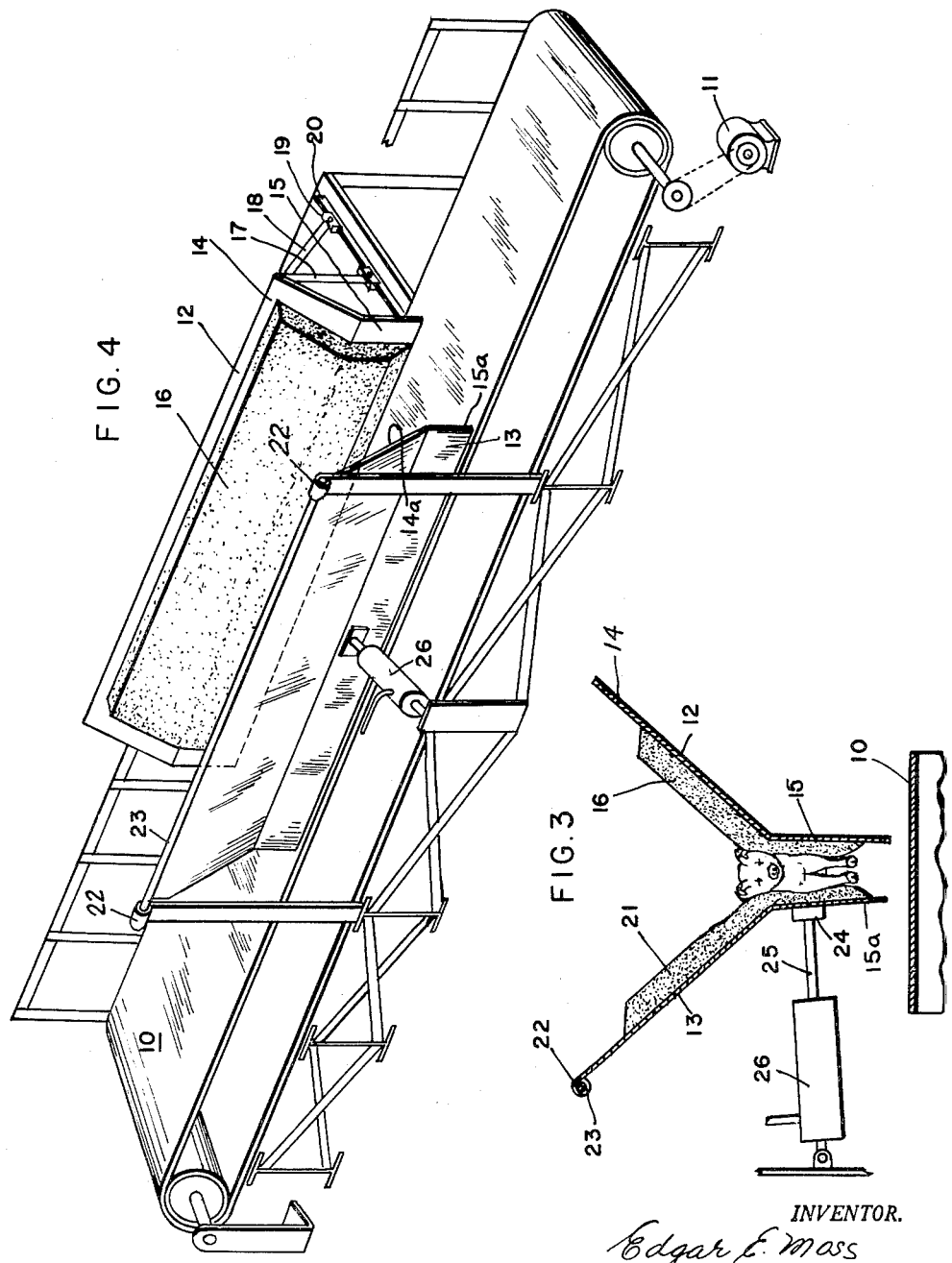

United States Patent Office 3,027,594
Patented Apr. 3, 1962

3,027,594
ANIMAL RESTRAINING SYSTEMS
Edgar E. Moss, Fair Lawn, N.J., assignor to Engelhorn Development Corporation, Newark, N.J., a corporation of New Jersey
Original application Feb. 20, 1959, Ser. No. 794,646, now Patent No. 2,912,715, dated Nov. 17, 1959. Divided and this application Sept. 3, 1959, Ser. No. 837,959
1 Claim. (Cl. 17—45)

This invention relates to an animal restrainging system or method and more particularly to such a system employed in the slaughtering of animals. This application is a division of my application Serial No. 794,646, filed February 20, 1959, now Patent No. 2,912,715, dated November 17, 1959.

This invention has been used in connection with the electrical stunning of animals prior to slaughtering but it may be employed in any slaughtering process. An object of this invention is to provide a novel system which substantially completely immobilizes the pig so as to render it incapable of physical resistance and by mechanism which is highly reliable in operation.

According to this invention, the animal is caused to proceed along a chute which includes a powered belt conveyor. Along a central portion of the chute is disposed an adjustable squeeze box which is arranged to intercept the travel of the animal, and to grasp the animal so as to render it substantially immobile while at the same time slightly lifting the animal above the conveyor belt so that it is free of the moving belt. The squeezing apparatus does not cause injury to the animal but it is nevertheless restrained against excessive movement. At this time, it may be slaughtered or stunned, electrically or otherwise.

The invention will be further understood from the following description and drawings in which:

FIGURE 3 is a diagrammatic view illustrating the action of the squeeze box section; and FIGURE 4 is a perspective view of the apparatus.

Figure 1:
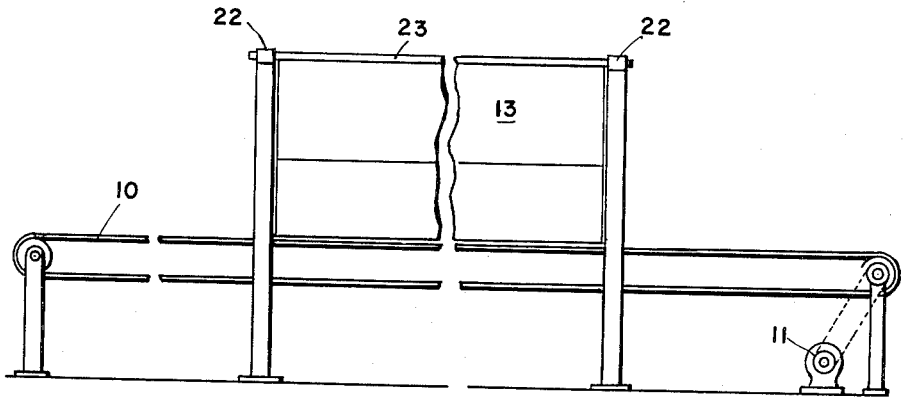
FIGURE 1 is an enlarged diagrammatic side elevational view of the restraining pen.

Referring to FIGURE 4, the animals, in single file, may be introduced onto the moving conveyor belt 10 which serves as a floor, the belt being driven as by a motor 11. The structure immediately prior to the moving belt may be largely conventional. For example it may comprise a runway and a vertical sliding gate, both not shown.

As the animal reaches the belt 10 it is carried thereby or it may proceed under its own power. It shortly reaches the squeeze box section which is disposed approximately centrally of the belt and comprises the horizontally elongated walls 12 and 13 which are relatively movable inwardly toward each other as will hereinafter be described.

Referring first to wall 12 it will be observed that it comprises an upper outwardly slanted section 14 which is continuous with a lower vertical section 15. The other wall 13 is similarly shaped, having an upper section 14a and a lower section 15a, so that both walls together are normally in the shape of a Y with the vertical portions thereof substantially parallel in the normal position of the device and open to permit the animal to be grasped by the walls, the lower vertical sections 15 and 15a grasping the legs of the animal.

Walls 12 and 13 are provided on their inner surfaces with an adhered blanket of cushioning material such as foam rubber 16.

It is desirable to adjust the distances between the squeeze box walls 13 and 14 in accordance with the type or size of animals being handled. Accordingly, wall 12 is provided with fixed links 17 and 18 the lower ends of which terminate in shoes 19 which may be slid along rail 20. Thus the box width is adjustable by sliding the shoes along rail 20 and thereafter tightening them into desired position as by set screws. As an example, it has been determined that the normal spacing between the upper ends of the walls 12 and 13 may be from about 36" to 54" while the normal distance between sections 15 and 15a may be about 9" to 12".

The opposing wall 13 is similarly provided with an adhered foam rubber blanket 21. Wall 13 may be provided with an upper hinge end 22 which rotatably embraces fixed shaft 23. The lower vertical section of wall 13 has connected thereto the piston head 24 and shaft 25 which is actuated by the pneumatic or hydraulic power cylinder 26.

The mechanism above described operates as follows:

The animal having been led to the conveyor belt 10, proceeds to the central section of the conveyor belt 10 into the area of the centrally disposed squeeze box section. At this time, the operator notes the position of the animal and causes cylinder 26 to be operated so as to exert inward pressure upon the lower, vertical section of wall 13.

Inasmuch as the wall 13 is swingably connected from the upper shaft 23, the wall 13 tends to rotate somewhat about the shaft 23 and its lower end describes an arc when thus actuated. Thus, in addition to squeezing the animal while drawing its legs together, the animal is lifted slightly so as to be clear of the moving conveyor belt 10 and it is thus maintained immobilized and stationary so as to be subjected to the slaughtering process. The walls 12 and 13, being horizontally elongated (about 72" long), substantially the entire length of the animal is grasped including its head. The head thus being rendered immobile, it is easy to apply the stunning electrodes or any other means to dispatch the animal.

After the animal has been rendered unconscious, the cylinder 26 is caused to retract the piston whereupon the wall 13 correspondingly retracts and the animal is released onto the conveyor belt 10 where, in prone position, it is discharged to a succeeding station.

Figure 2:
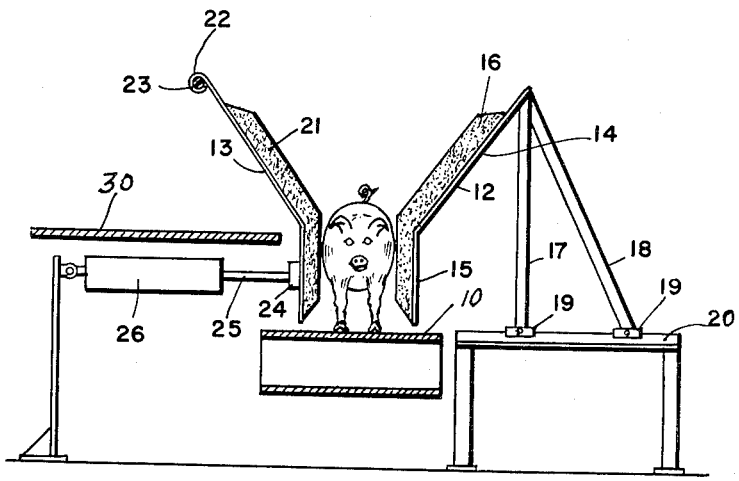
FIGURE 2 is a diagrammatic front view thereof, partially in cross-section.

As noted in FIGURE 2, a platform 30 may be provided upon which the operator stands. He is thus able to note the position of the animal and is also able to apply the stunning electrodes to the animal.

The foam rubber cushioning material contributes materially in restraining the animal and immobilizing its head and body without injuring and thereby unduly frightening the animal. As an example, foam rubber of about 6 inches thick has been used successfully. However, it is apparent that alternative cushioning agents may be employed.

There has been shown what is now considered a preferred embodiment of the invention but it is obivous that changes and omissions may be made without departing from its spirit.

What is claimed is:

A method of slaughtering an animal while the animal is being conveyed by a moving conveyor belt, said method comprising pressing upwardly against the animal's body so as to lift it above the moving conveyor belt, stunning it, and thereafter dropping it back onto said moving conveyor belt.

References Cited in the file of this patent

UNITED STATES PATENTS

| | | |
|---|---|---|
| 1,058,509 | Wiltmann | Apr. 8, 1913 |
| 1,599,134 | King | Sept. 7, 1926 |
| 2,764,129 | Haggard | Sept. 25, 1956 |

FOREIGN PATENTS

| | | |
|---|---|---|
| 25,662 | Great Britain | 1896 |
| 531,186 | Germany | Aug. 6, 1931 |